US 6,678,420 B1

(12) United States Patent
Takeo et al.

(10) Patent No.: US 6,678,420 B1
(45) Date of Patent: Jan. 13, 2004

(54) METHOD, APPARATUS AND RECORDING MEDIUM FOR IMAGE PROCESSING

(75) Inventors: Hideya Takeo, Kanagawa-ken (JP); Wataru Ito, Kanagawa-ken (JP); Masahiko Yamada, Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/335,685

(22) Filed: Jun. 18, 1999

(30) Foreign Application Priority Data

Jun. 19, 1998 (JP) .......................................... 10-172327

(51) Int. Cl.[7] ................................................ G06K 9/46
(52) U.S. Cl. ...................................... 382/240; 382/239
(58) Field of Search ................................ 382/240, 239; 707/110; 348/14.14; 370/402, 241; 709/230

(56) References Cited

U.S. PATENT DOCUMENTS

| 4,315,318 A | | 2/1982 | Kato et al. ................... 364/515 |
|---|---|---|---|
| 4,317,179 A | | 2/1982 | Kato et al. ................... 364/515 |
| 5,454,044 A | | 9/1995 | Nakajima ..................... 382/132 |
| 5,598,214 A | * | 1/1997 | Kondo et al. ................. 348/414 |
| 5,608,813 A | | 3/1997 | Nakajima ..................... 382/132 |
| 5,663,764 A | * | 9/1997 | Kondo et al. ................. 348/414 |
| 5,832,215 A | * | 11/1998 | Kato et al. ................... 709/230 |
| 5,859,667 A | * | 1/1999 | Kondo et al. ................. 348/414 |

FOREIGN PATENT DOCUMENTS

| EP | 0 766 202 A3 | 1/1998 | ............. G06T/3/40 |
|---|---|---|---|
| JP | 55-87953 | 7/1980 | ........... G01N/33/50 |
| JP | 55-163472 | 12/1980 | ............. G01T/1/29 |
| JP | 3-222577 | 10/1991 | ............ H04N/1/41 |

OTHER PUBLICATIONS

Avrithis et al., "Fuzzy Image Classification Using Multi-resolution Neural Networks with Applications to Remove Sensing", IEEE International Conference on Digital Signal Processing Proceedings, vol. 1, Jul. 1997, pps. 261–264.*

* cited by examiner

Primary Examiner—Anh Hong Do
(74) Attorney, Agent, or Firm—Sughrue Mion, PLLC (57) ABSTRACT

Image data transferred progressively can be processed efficiently. Image data are transferred progressively from an image server to a display terminal via a network. Images are progressively displayed on a monitor and a user views the images reproduced progressively on the monitor. The user inputs an interruption of transfer by using input means when a image has a sufficient resolution for reading. In response, the image server interrupts progressive transfer of the image data. In this manner, data at a resolution unnecessary for reading are not transferred after the interruption, and time necessary for data transfer can be shortened. In this manner, an efficient diagnosis can be carried out.

50 Claims, 6 Drawing Sheets

METHOD, APPARATUS AND RECORDING MEDIUM FOR IMAGE PROCESSING

BACKGROUND OF THE INVENTION

1. Filed of the Invention

The present invention relates to an image processing method and an image processing apparatus which are used in progressive transfer of hierarchically stored image data and for carrying out processing, based on data at an intermediate hierarchical level being transferred, on hierarchical data to be transferred after the data at the intermediate hierarchical level have been transferred and/or on image data having been transferred, and also to a recording medium readable by a computer and storing a program to cause a computer to execute the processing.

2. Description of the Related Art

In the case where image data stored in an image server or the like are transferred to a terminal to be displayed on a monitor such as a CRT display, the image data are conventionally transferred through raster scan thereof. Therefore, an image is raster-displayed on the monitor. In other words, the image is sequentially reproduced on the monitor from the top to the bottom thereof. Likewise, when an image recorded in a recording medium such as a ZIP disc or an MO disc is displayed on a monitor, the image data are read from the recording medium and transferred to the monitor while being raster-scanned. In other words, the image is displayed while being raster-scanned. For this reason, in the field of medicine for example, when a patient's radiation image or the like is transferred from an image server and displayed on a monitor, the content of the image is not understood until the entire image has been displayed even in the case where the image being transferred is unnecessary or wrong. As a result, confirmation of the content of an image is time-consuming and efficient diagnosis is not carried out.

Meanwhile, a photograph finishing system in a laboratory displays each image stored in a recording medium on a monitor and after that appropriateness of the image and necessity of correction are judged. Therefore, if image data are read from a recording medium and displayed on a monitor while being raster-scanned, confirmation of the content of the image after the entire image has been displayed is time-consuming and efficient printing cannot be carried out.

As a format for storing image data, various formats such as JPEG, GIF, and TIFF are used. Recently, another format has been proposed. According to this format, image data are stored in a hierarchy based on resolution or density resolution by using wavelet transform or the like and data at each level of the hierarchy (hierarchical data) are stored after coding and compression thereof. This storage format is called JPEG 2000 format. More specifically, image data are decomposed into hierarchical data according to multiple resolutions or density resolutions through wavelet transform or the like, and the hierarchical data at each resolution or density resolution are coded according to the hierarchy and saved as a file after compression thereof.

The JPEG 2000 method has the following characteristics:

(1) Unlike DCT (Discrete Cosine Transform) method used in the conventional JPEG format, no artifacts such as block distortion are created, since image data are not processed in each block.

(2) Only resolution information which is necessary for transfer of image data needs to be transferred, since the image data are to coded hierarchically. This enables efficient image transfer.

(3) Various kinds of image processing such as frequency enhancing processing can be carried out comparatively easily, since image data are decomposed into data at multiple resolutions or multiple density resolutions.

(4) Simultaneous decomposition of space and frequency according to multiple-resolution analysis is possible. In a low frequency range wherein coding is greatly affected, an orthogonal transform can be carried out in a wide range, whereas in a high frequency range, an orthogonal transform is possible in a narrow range. Therefore, even when quantization noise near an edge of an image is generated, spatial spread of the noise can be suppressed. As a result, the noise is not easy to perceive.

Like a FlashPix file proposed by Eastman Kodak Co., a file format enabling storage of data sets having different characteristics in a file has also been proposed. Hierarchical data decomposed into multiple resolutions or density resolutions can be stored in such a file according to the FlashPix standard.

When image data storing hierarchical images, such as in a JPEG 2000 file or a FlashPix file, are displayed on a monitor or the like, sequential data transfer to the monitor and image reproduction on the monitor from low resolution or low density resolution (hereinafter, simply expressed as resolution) to high resolution is carried out. This is called progressive transfer (or progressive reproduction in the case of reproduction). When the data transferred progressively are displayed on a monitor, an entire low resolution image is displayed first, and images with gradually improving sharpness are reproduced in accordance with increasing resolution of the data.

In the case of a FlashPix file, sequential display of transferred hierarchical image data leads to progressive reproduction of the images. In the case of a JPEG 2000 file, the transferred hierarchical data are first restructured into data enabling reproduction of an image at the resolution or density resolution according to the hierarchical level of the image and images are progressively reproduced based on the restructured data. As for the JPEG 2000 file, data enabling reproduction of an image can be generated from hierarchical data by a server storing the file and transferred from the server in some cases. The images are progressively reproduced by sequential reproduction of the transferred data from low resolution to high resolution.

An object of the present invention is therefore to provide an image processing method and an image processing apparatus for carrying out processing on image data transferred progressively in the manner as has been described above, and a computer-readable recording medium storing a program to cause a computer to execute the processing.

SUMMARY OF THE INVENTION

An image processing method of the present invention is an image processing method of carrying out processing, upon progressive transfer of hierarchically stored image data at each hierarchical level, on hierarchical data to be transferred progressively and/or on image data having been transferred. The image processing method of the present invention comprises the steps of:

determining the content of processing carried out, based on hierarchical data at a predetermined intermediate hierarchical level out of the hierarchical data at each hierarchical level transferred progressively, on hierarchical data to be transferred after the data at the intermediate hierarchical level and/or on the image data having been transferred, and carrying out processing on the hierarchical data to be transferred and/or on the image data having been transferred, based on the determined content of the processing.

The term "progressive transfer" means transferring hierarchically stored image data structured according to multiple resolutions or density resolutions, sequentially from low resolution data to high resolution data. The data at each hierarchical level may have been coded or not coded. The hierarchical data to be transferred are different depending on a file format of the image data. In other words, in the case of a JPEG 2000 file (hereinafter called case 1), the data to be transferred progressively are data representing an edge component (high frequency component) at each resolution hierarchically structured by wavelet transform, or data representing an edge component in an image at each density resolution. In the case of a FlashPix file (hereinafter called case 2), the data to be transferred are data corresponding to a resolution or density resolution. In the case of a JPEG 2000 file storing hierarchical data at each hierarchical level to be restructured into data enabling reproduction of an image before being transferred (hereinafter called case 3), the data to be transferred progressively mean data corresponding to the resolution or density resolution, as in the case of the FlashPix file.

The "intermediate level data" means hierarchical data transferred earlier than hierarchical data at a highest resolution or highest density resolution to be transferred last. The intermediate level data enable reproduction of an image at a resolution or density resolution lower than the highest resolution or density resolution. In other words, for the case 1 above, the intermediate level data means restructured data enabling reproduction of the transferred hierarchical data as an image. For the cases 2 and 3, the intermediate level data mean the hierarchical data having been transferred.

The "hierarchical data to be transferred" mean hierarchical data representing an image at a resolution or density resolution higher than that of the intermediate level data.

The "image data having been transferred" mean image data enabling reproduction of an original image. For the case 1 above, the image data having been transferred represent an image at the highest resolution or density resolution restructured from hierarchical data at all resolutions or density resolutions having been transferred progressively. For the cases 2 and 3, the image data having been transferred mean data at a highest resolution or density resolution having been transferred progressively.

It is preferable for the content of the processing to be processing to interrupt the progressive transfer of the hierarchical data to be transferred. After the progressive transfer of the hierarchical data to be transferred has been interrupted, the processing preferably resumes the transfer.

Furthermore, it is preferable for the content of the processing to be a condition of image processing carried out on the image data having been transferred.

An image processing apparatus of the present invention carries out processing, upon progressive transfer of hierarchically stored image data at each level, on hierarchical data to be transferred progressively and/or on image data having been transferred. The image processing apparatus comprises processing means for determining, based on hierarchical data at a predetermined intermediate hierarchical level out of the hierarchical data transferred progressively, the content of the processing on hierarchical data to be transferred after the predetermined intermediate level data and/or on the image data having been transferred, and for carrying out the processing on the hierarchical data to be transferred and/or on the image data having been transferred, based on the determined content of the processing.

More specifically, it is preferable for the processing means to comprise:

reproduction means for progressively reproducing the hierarchical data at each level transferred progressively;

interruption input means for receiving an input for interrupting the progressive transfer; and interruption means for interrupting the progressive transfer when the interruption input is received by the interruption input means.

"Progressively reproducing" herein referred to means, for the case 1 above, restructuring images from the hierarchical data having been transferred progressively and displaying the images gradually from a low resolution or density resolution. For the cases 2 and 3, progressive reproduction means sequential display of transferred hierarchical data gradually from a low resolution or density resolution in the order of the transfer.

In this manner, the transferred hierarchical data at each level are reproduced progressively by the reproduction means and when the interruption input is received from the interruption input means, the progressive reproduction is suspended.

In this case, it is preferable for the processing means to comprise:

resumption input means for receiving an input to resume the progressive transfer; and resumption means for resuming the progressive transfer in the case where the resumption input has been received by the resumption input means. In this manner, progressive transfer is resumed after the resumption input has been received by the resumption input means, and hierarchical data to be transferred after the predetermined intermediate level data are transferred.

It is preferable for the processing means to further comprise canceling means for canceling the progressive transfer when no input is received by the resumption input means within a predetermined amount of time after the interruption of the progressive transfer by the interruption means.

Furthermore, in this case, it is preferable for the image processing apparatus to further comprise image processing means for obtaining processed hierarchical data by carrying out predetermined image processing on the hierarchical data at each level reproduced progressively, based on resolution information thereof, and the reproduction means progressively reproduces the processed hierarchical data.

For the case 1, the hierarchical data subjected to image processing are obtained by restructuring the transferred hierarchical data as an image. For the cases 2 and 3, the hierarchical data subjected to the image processing mean the hierarchical data having been transferred.

In this case, the processed image data subjected to the predetermined image processing do not represent a high frequency component in accordance with the resolution of the data, but data enabling reproduction of an image at a resolution or density resolution lower than the highest resolution or density resolution.

In this manner, the hierarchical data at each level transferred progressively are reproduced progressively after image processing has been carried out thereon in accordance with the resolution thereof.

As the "predetermined image processing", unsharp masking processing described in Japanese Unexamined Patent Publication Nos. 55(1980)-163472, 55(1980)-87953, and 3(1991)-222577 and frequency processing such as dynamic range compression processing can be listed.

As the "resolution information", information on resolution of the hierarchical data (such as dpi and cycles/mm) is listed. If a file has a hierarchy of ½" resolutions such as a wavelet transform and in the FlashPix format, information on the highest resolution and hierarchical levels can be listed as such information.

It is preferable for the processing means to comprise:

reproduction means for progressively reproducing the hierarchical data at each level transferred progressively; and interruption means for interrupting the progressive transfer immediately after the predetermined intermediate level data have been transferred.

In this manner, the transferred hierarchical data at each level are reproduced progressively by the reproduction means and the progressive transfer is interrupted by the interruption means immediately after the predetermined intermediate level data have been transferred.

In this case, it is preferable for the processing means to comprise resumption input means for receiving an input for resumption of the progressive transfer; and resumption means for resuming the progressive transfer when the resumption input is received by the resumption input means. In this manner, the progressive transfer is resumed when the resumption input is received by the resumption input means and hierarchical data to be transferred after the predetermined intermediate level data are transferred.

Moreover, it is preferable for the processing means to comprise canceling means for canceling the progressive transfer when the resumption input means receives no input within a predetermined amount of time after the interruption of the progressive transfer by the interruption means.

In this case, it is preferable for the image processing apparatus to further comprise:

image processing means for obtaining processed image data by carrying out predetermined image processing on the hierarchical data at each level reproduced progressively, based on resolution information of the progressively reproduced hierarchical data; and the reproduction means is means for progressively reproducing the processed hierarchical data.

It is also preferable for the processing means to comprise:

image processing condition determining means for determining a condition of image processing carried out on the image data having been transferred, based on the predetermined intermediate level data; and image processing means for carrying out image processing on the image data having been transferred, based on the image processing condition.

In this manner, the condition of the image processing based on the intermediate level data on the image data having been transferred is determined in parallel to the progressive transfer, after the predetermined intermediate level data have been transferred. When the image data having been transferred are obtained after the hierarchical data at all levels have been transferred, the processing according to the image processing condition is carried out on the image data having been transferred.

It is preferable for the processing means to comprise:

reproduction means for progressively reproducing the hierarchical data at each level transferred progressively;

interruption means for interrupting the progressive transfer immediately after the predetermined intermediate level data have been transferred;

image processing condition input means for receiving an input of a condition of image processing determined based on the predetermined intermediate level data and carried out on the image data having been transferred;

resumption input means for receiving an input for resumption of the progressive transfer;

resumption means for resuming the progressive transfer in the case where the resumption input means has received the resumption input; and image processing means for carrying out image processing on the image data having been transferred, based on the image processing condition.

According to this processing means, the transferred hierarchical data at each level can be reproduced progressively by the reproduction means, and the progressive transfer is suspended by the interruption means after the predetermined intermediate level data have been transferred. An operator views the predetermined intermediate level data displayed by the reproduction means and inputs, by using the image processing condition input means, the image processing condition for the image data having been transferred, if necessary. Thereafter, when the resumption input is received by the resumption input means, the progressive transfer is resumed. When the image data having been transferred are received, image processing is carried out thereon based on the input image processing condition.

In this case, the resumption means preferably resumes the progressive transfer when no resumption input is received by the resumption input means within a predetermined amount of time after the interruption of the progressive transfer by the interruption means.

Furthermore, in this case, it is preferable for the image processing apparatus to comprise:

image processing means for obtaining processed image data by carrying out predetermined image processing on the hierarchical data at each level reproduced progressively, based on resolution information of the progressively reproduced hierarchical data, and the reproduction means reproduces the processed image data progressively.

In this manner, the hierarchical data at each level can be reproduced progressively after image processing in accordance with the resolution thereof has been carried out thereon.

The processing carried out by each means above may be provided as a program recorded in a computer-readable recording medium to cause a computer to execute the processing.

According to the present invention, the content of the processing on the hierarchical data to be transferred after the predetermined intermediate level data and/or on the image data having been transferred is determined based on the intermediate level data out of the hierarchical data to be transferred progressively, and the processing based on the processing content is carried out on the hierarchical data to be transferred and/or on the image data having been transferred. For example, if the processing is interruption of the progressive transfer, transfer of the data to be transferred is interrupted, and an image obtained by reproduction of the intermediate level data corresponds to the resolution or density resolution of the intermediate level data. Therefore, an operator can judge the content of the image by viewing the image corresponding to the resolution or the density resolution of the intermediate level data, and confirmation of a transferred image can be carried out efficiently when the image transferred progressively is reproduced progressively.

If the transfer can be resumed after interruption thereof, when an operator judges an image to be necessary by viewing the image obtained by reproducing the intermediate level data, hierarchical data to be transferred can be transferred thereafter. Therefore, the transfer is canceled if the image data are not necessary, whereas the transfer is resumed if the data are necessary. In this manner, efficient transfer can be carried out.

In this case, the processed hierarchical data are obtained by carrying out image processing on the hierarchical data at each level transferred progressively, according to the resolution thereof. By progressively reproducing the processed hierarchical data, an image having the same frequency characteristic as an image obtained by image processing on the image data having been transferred can be obtained. Therefore, the image can be confirmed in the same manner as for an image at the highest resolution or density resolution. Consequently, judgment as to interruption or resumption of transfer can be carried out easily and efficient progressive transfer can be realized.

Furthermore, by determining the image processing to be carried out on the hierarchical data to be transferred based on the intermediate level data, progressive transfer can be carried out at the same time as determination of the processing condition. Therefore, image processing on the image data immediately after completion of the progressive transfer becomes possible. In this manner, efficient image processing can be carried out on the image data.

BRIEF DESCRIPTION OF THE DRAWINGS

FIG. 9, is a flowchart showing yet another embodiment of the invention.

DESCRIPTION OF THE PREFERRED EMBODIMENTS

Hereinafter, embodiments of the present invention will be explained with reference to the accompanying drawings.

Figure 1:
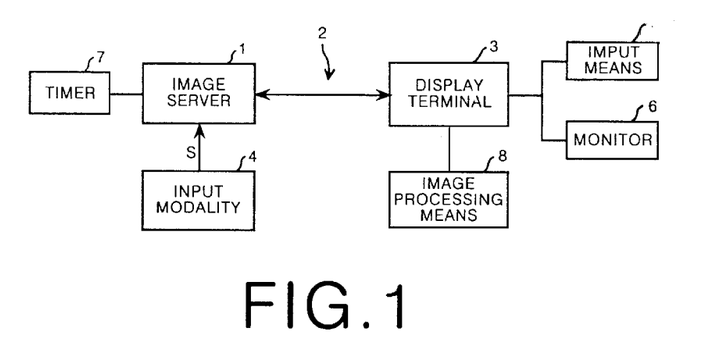
FIG. 1 is a diagram showing a configuration of an image processing system according to a first embodiment of the present invention.

FIG. 1 is a block diagram showing a configuration of an image processing system employing an image processing method according to a first embodiment of the present invention. The image processing system carries out processing on a medical image and comprises an image server 1 storing a plurality of image data sets S and a display terminal 3 connected to the image server 1 via a network 2.

The image data S recorded by an input modality 4 such as a CR apparatus, a CT apparatus, or an MRI apparatus are decomposed hierarchically according to resolution or density resolution and the hierarchical data at each resolution are coded. The image server 1 compresses and stores the coded data as data which can be transferred progressively. In this embodiment, the image data S are stored hierarchically according to the resolution.

Figure 2A:
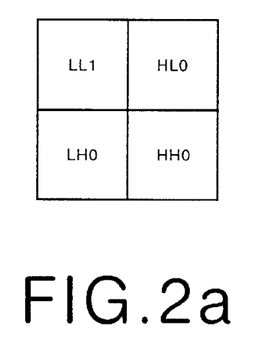
FIGS. 2a, 2b and 2c are diagrams showing states where coding is carried out at each hierarchical level by using wavelet transform on image data.
Figure 2B:
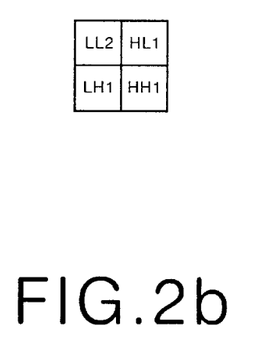
Figure 2C:
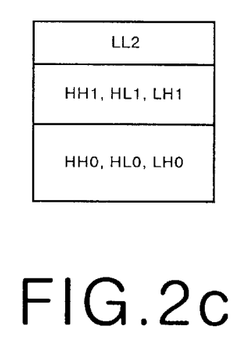

The image data S are stored after being decomposed into the hierarchical data at each hierarchical level in the manner specifically described below. As shown in FIG. 2(a), the image data S are subjected to wavelet transform and decomposed into data at 4 resolutions, namely LL1, HL0, LH0 and HH0. The data LL1 represents an image whose width and height have been reduced to ½ of those of the original image, and the data HL0, LH0 and HH0 respectively represent images of a vertical edge component, a horizontal edge component, and a diagonal edge component (high frequency component). As shown in FIG. 2(b), 4 sets of data LL2, HL1, LH1 and HH1 are obtained through wavelet transform on the data LL1. The data LL2 represents an image whose width and height have been reduced to ½ of those of the data LL1, and the data HL1, LH1 and HH1 represent images of a vertical edge component, a horizontal edge component and a diagonal edge component of the data LL1. The wavelet transform is repeated a desired number of times on data LL obtained at each wavelet transform, and data at multiple resolutions are thereby obtained. Thereafter, as shown in FIG. 2(c), the data at each resolution are coded, and the coded data are recorded as hierarchical data in a file in a recording medium. The hierarchical data are stored in the image server 1 after being compressed. The hierarchical data are data obtained by compression of data HL, LH, HH and LL (a lowest resolution only). The image server 1 comprises a timer 7 which will be described later.

Input means 5 comprising a keyboard and a mouse for inputting various instructions, a monitor 6 for displaying an image, and image processing means 8 for carrying out image processing on transferred data are connected to the display terminal 3.

Figure 3:
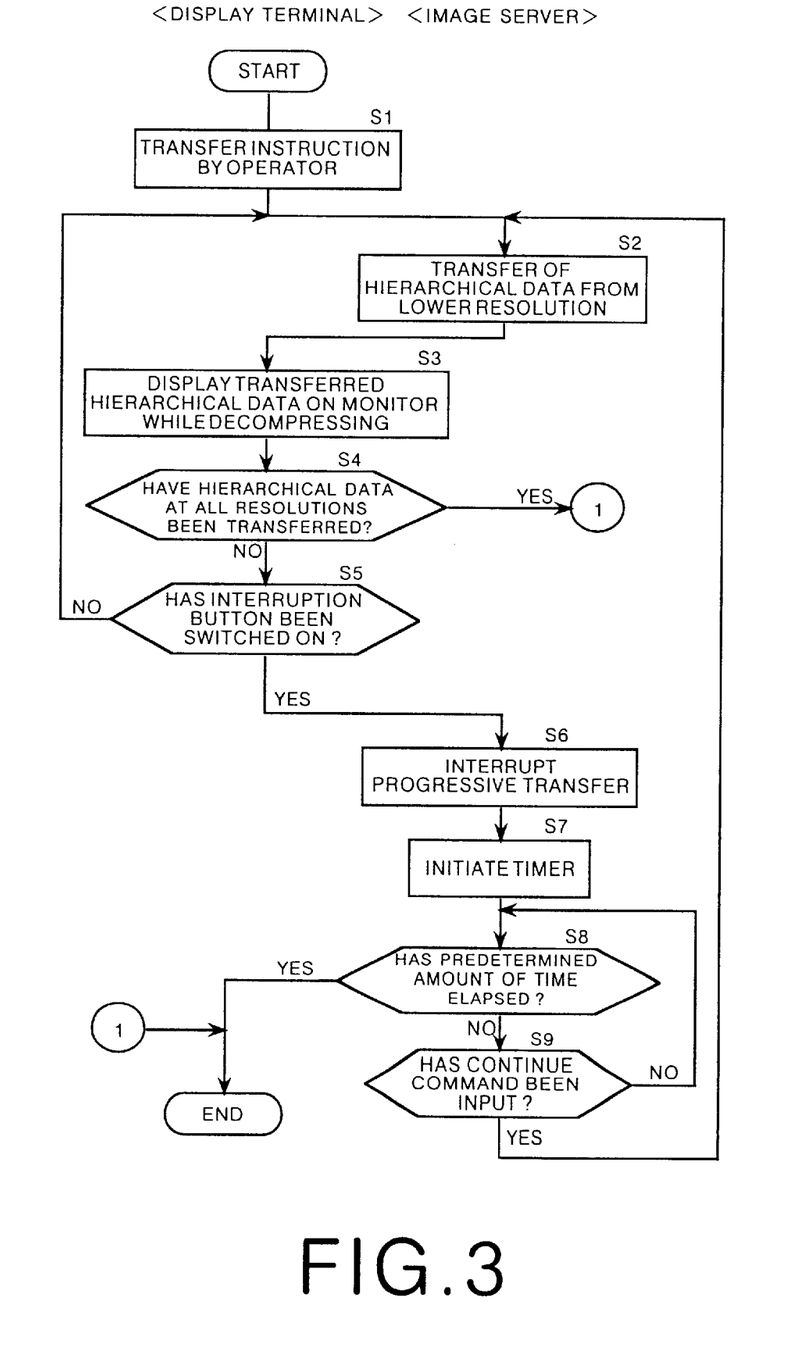
FIG. 3 is a flow-chart showing an operation of the first embodiment.

An operation of the first embodiment will be explained below. FIG. 3 is a flow-chart showing the operation of the first embodiment. At a step S1, an operator inputs a transfer instruction for desired image data by using the input means 5 of the display terminal 3. The instruction is input to the image server 1 via the network 2. When the image server receives the transfer instruction, the image server 1 transfers the desired image data S having been compressed in the above manner sequentially from lower resolution data to the display terminal 3 (step S2). The display terminal 3 sequentially decompresses the progressively transferred hierarchical data while restructuring the data into images. The display terminal 3 displays the images sequentially from a lower resolution on the monitor 6 (step S3). In this manner, the images are progressively displayed on the monitor 6.

In the case of medical images, sufficient image reading and diagnosis can be carried out in some cases on an image at resolution lower than a highest resolution. Therefore, an operator views the images progressively displayed on the monitor 6 and interrupts progressive transfer by switching on an interruption button set in the input means 5 when the resolution reaches a level sufficient for image reading. In order to carry out this operation, whether or not the hierarchical data at all resolutions have been transferred is judged at a step S4. If the step S4 has been confirmed, the processing is finished, since the hierarchical data at all resolutions have been transferred without the interruption button being switched on. If the result of judgment in step S4 is no, whether or not the interruption button has been switched on is judged at a step S5. If the result of judgment in step S5 is no, the processing returns to the step S2 and transfer of hierarchical data to be transferred continues. The processing from the step S2 to the step S5 is thus repeated. If the interruption button is judged to have been switched on, the judgment result in step S5 is yes and the instruction is transferred to the image server 1. The image server 1 interrupts the progressive transfer in response to the interruption command (step S6), and starts up the timer 7 (step S7).

In this state, the operator reads an image if the image being displayed on the monitor 6 has a sufficient resolution. However, if the operator judges the necessity of detailed image at a higher resolution, a continue command is input from the input means 5 within a predetermined amount of time. In order to carry out this, the image server 1 judges at a step S8 whether or not the predetermined amount of time has elapsed after the start of the timer 7. When no continue command is input from the display terminal 3 in the predetermined amount of time, the image server judges that transfer of hierarchical image data is not needed anymore, and finishes the processing by completely stopping the progressive transfer. Meanwhile, if the judgment result at step S8 is no, whether or not the continue command has been input is judged at a step S9. When no continue command has been input, the processing returns to the step S8, and repeats the processing of the steps S8 and S9. Meanwhile, if the continue command has been input, the processing returns to the step S2 and resumes the transfer of the hierarchical data to be transferred. The processing from the step S2 through the step S9 is repeated and the processing ends when the hierarchical data at all resolution are transferred or when no continue command is input within the predetermined amount of time after switching on the interruption button.

As has been described above, in this embodiment, the hierarchical data transferred progressively are reproduced progressively on the monitor 6 and the progressive transfer is interrupted when the hierarchical data having a sufficient resolution for image reading are transferred. Therefore, no hierarchical data at resolutions higher than that of the data at the time of interruption need to be transferred. In this manner, time necessary for transfer of the data in hierarchical levels higher than that of the data at the interruption can be shortened. Therefore, an efficient diagnosis can be carried out. When an image at a resolution higher than that of the data at the interruption is necessary, the transfer can be resumed, and a discretional request by the operator can be met. Moreover, when no continue command is input within the predetermined amount of time after the transfer interruption, the progressive transfer is stopped completely. Therefore, the operator does not need to input a cancel command when he/she wishes to cancel the progressive transfer. In this manner, a workload on the operator can be reduced by omitting his/her operation.

In the first embodiment, the operator switches on the interruption button to interrupt the progressive transfer when the hierarchical data at a resolution sufficient for reading are transferred. The resolution needed for reading is known by experience, and the resolution may be preset to the display terminal 3. After the hierarchical data at the resolution have been transferred, the instruction of transfer interruption may be input automatically from the display terminal 3 to the image server 1. In this manner, a workload on the operator can be reduced more by further omitting his/her operation.

A second embodiment of the present invention will be explained next. An image processing system according to the second embodiment has the same configuration as the image processing system of the first embodiment shown in FIG. 1. Therefore, detailed explanation thereof is omitted here. In the second embodiment, a condition of image processing carried out on image data having been transferred is determined based on hierarchical data at a predetermined resolution among medical image data transferred progressively, and the image processing is carried out on the image data having been transferred.

Figure 4:
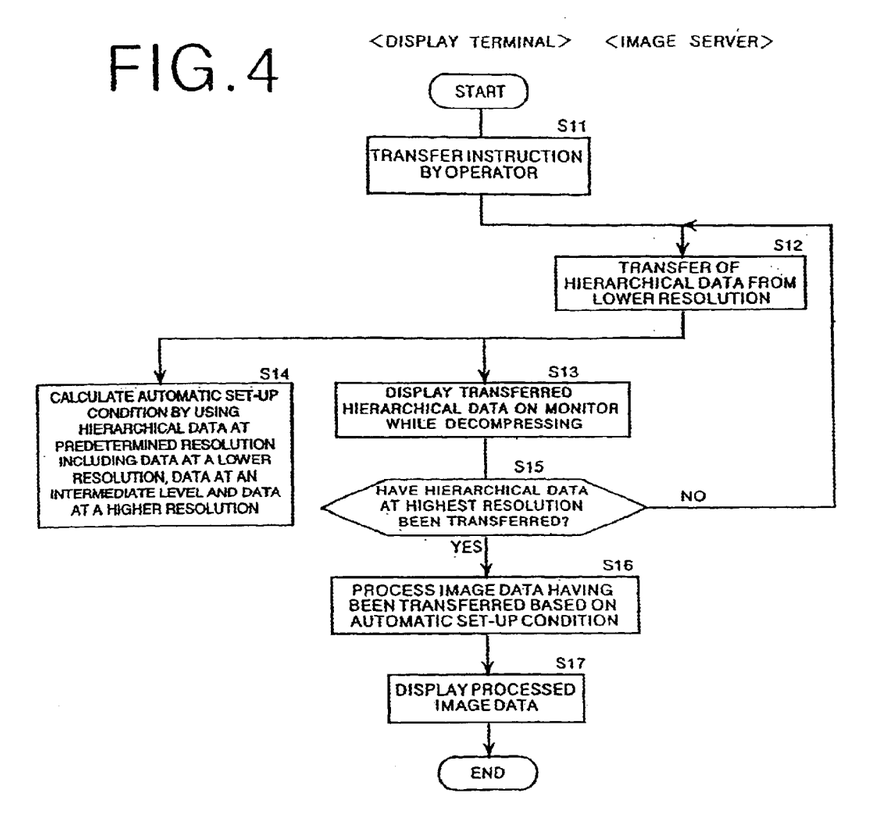
FIG. 4 is a flow-chart showing an operation of a second embodiment.

FIG. 4 is a flow-chart showing an operation of the second embodiment. At a step S11, an operator inputs an instruction to transfer desired image data by using input means 5 of a display terminal 3. The instruction is input to an image server 1 via a network 2. The image server 1 transfers image data S having been compressed in the above manner sequentially from a lower resolution to the display terminal 3 in response to the instruction input thereto (step S12). The display terminal 3 restructures the hierarchical data having been transferred progressively as images while decompressing the data, and displays the images sequentially from low to high resolution on a monitor 6 (step S13). In this manner, images are progressively displayed on the monitor 6.

Meanwhile, after hierarchical data at a predetermined resolution (for example, hierarchical data at a lowest resolution) have been transferred, image processing means 8 in the display terminal 3 determines an automatic set-up condition for the image data having been transferred (step S14), by using the hierarchical data at the predetermined resolution having been transferred. The processing at the step S14 is carried out in parallel to the progressive transfer at the step S13. The automatic set-up condition means a condition of a tone, frequency processing and the like when the image data having been transferred are displayed on the monitor 6. At a step S15, whether or not hierarchical data at a highest resolution have been transferred is judged. If the result of judgment in step S15 is no, the processing returns to the step S12 and the processing at the steps S13 and S15 is repeated. If the result of judgment in step S15 is yes, image processing is carried out on the image data having been transferred, based on the automatic set-up condition having been calculated at the step S14, and processed image data are obtained (step S16). The processed image data are displayed on the monitor 6 at a step S17, and the processing is completed.

As has been described above, in the second embodiment, the automatic set-up condition is found in parallel to the progressive transfer, based on the hierarchical data at the predetermined resolution transferred progressively. Therefore, processing can be carried out on the image data having been transferred, immediately after completion of the progressive transfer thereof. In this manner, efficient processing can be carried out on the image data having been transferred.

In the second embodiment, the set-up condition is found by automatically detecting the transfer of the hierarchical data at the predetermined resolution by using the display terminal 3. However, viewing the images reproduced progressively on the monitor 6, an operator may interrupt the progressive transfer and input an instruction to calculate the automatic set-up condition, by using the input means 5 at the time of completion of transfer of the hierarchical data at the predetermined resolution. In this case, the instruction for automatic set-up condition calculation may be input without interrupting the progressive transfer.

Alternatively, the operator may interrupt the progressive transfer at the time of completion of the transfer of the hierarchical data at the predetermined resolution, view the image at the predetermined resolution on the monitor 6, and input using the input means 5, an instruction to indicate whether or not the automatic set-up condition should be calculated based on the hierarchical data at the resolution. When the operator judges that the automatic set-up condition may be found by using the hierarchical data at the resolution, the operator inputs the judgment by using the input means 5, and the automatic set-up condition is found based on the hierarchical data at the resolution. On the contrary, when the operator judges that the automatic set-up condition is not to be found by using the hierarchical data at the resolution, the operator inputs an instruction to resume the progressive transfer by using the input means 5. In this case, the operator inputs the instruction to calculate the automatic set-up condition by using the input means 5 after hierarchical data at a desired resolution have been transferred, and the automatic set-up condition is then calculated.

Figure 5:
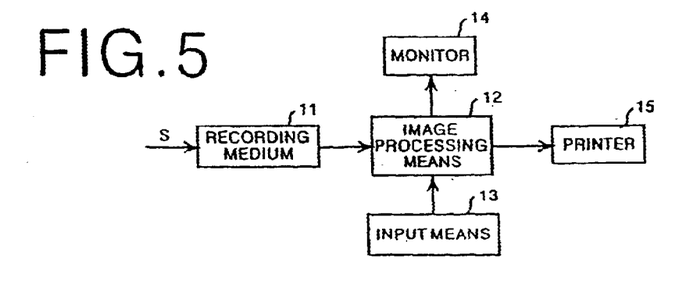
FIG. 5 is a diagram showing a configuration of an image processing system according to a third embodiment of the present invention.

A third embodiment of the present invention will be explained next. FIG. 5 is a block diagram showing a configuration of an image processing system according to the third embodiment. As shown in FIG. 5, the image processing system is a system at a laboratory carrying out photographic printing. The image processing system comprises image processing means 12 for carrying out image processing on image data S recorded in a recording medium 11, input means 13 including a keyboard and a mouse and for inputting various kinds of instructions, a monitor 14 for displaying an image, and a printer 15 for printing an image.

At home, a user manipulates the image data S obtained by the user by using a digital camera or provided to the user from a laboratory by reading images recorded on a film. The manipulated image data S are recorded in the recording medium such as an MO disc and brought in to the laboratory. At this time, as in the first embodiment, the image data S are hierarchically decomposed into multiple resolutions and recorded in the recording medium as data enabling progressive transfer, after coding of the data at each resolution.

In the laboratory, in order to improve productivity, the image data S brought in by a plurality of users are recorded in the recording medium 11 having a large capacity (such as a hard disc, a JAZ disc, a CD-RW, and a DVD-RW) so that the image data S can be processed collectively.

Figure 6:
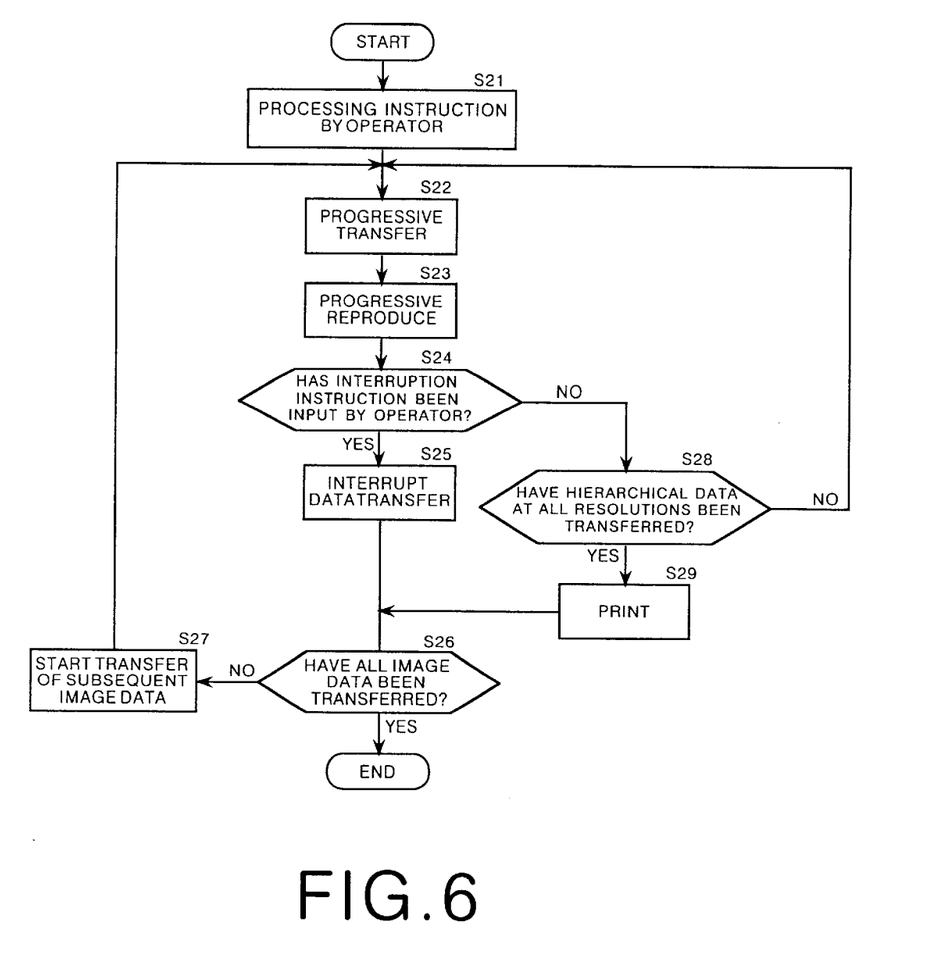
FIG. 6 is a flow-chart showing an operation of the third embodiment.

FIG. 6 is a flow-chart showing an operation of the third embodiment. When an operator inputs a processing instruction by using the input means 13 at a step S21, the image processing means 12 sequentially reads the image data S at each hierarchical level from the recording medium 11 and progressively transfers the image data S to the monitor 14 (step S22). The images are reproduced on the monitor 14 (step S23). The operator views the images progressively reproduced on the monitor 14 while the data at each level are being transferred. When the operator judges that an obviously erroneous image such as a totally black image or an image not to be printed such as an unethical image is being transferred, the operator inputs an instruction to interrupt the transfer by using the input means 13. At a step S24, whether or not the transfer interruption has been instructed by the operator is judged and the transfer of the hierarchical data to the monitor 14 is interrupted at a step S25 when the transfer interruption has been instructed. Whether or not all the image data S recorded in the recording medium 11 have been transferred is judged at a step S26, and the processing is completed if the result of judgment in step 26 is yes. When the result of judgment in step 26 is no, transfer of the subsequent image data is initiated at a step S27, and the processing from the step S22 to the step S27 is repeated.

Meanwhile, when no transfer interruption has been instructed by the operator at the step S24, whether or not all the hierarchical data S at all resolutions have been transferred is judged at a step S28. If the result of judgment in step S28 is no, the processing returns to step S22, and the processing from the step S22 to the step S24 is repeated. When transfer of the image data S at all resolutions has been confirmed at the step S28, the image processing means 12 carries out color conversion processing for printing on the image data having been transferred and obtained by restructuring the hierarchical data at all resolutions. The processed data are input to the printer 15 to be reproduced as a print (step S29). The processing returns to the step S26 after printing of the processed image data or after the transfer of the processed image data to the printer 15. Alternatively, after the transfer of the hierarchical data at all resolutions, the above processing is repeated until printing of all the image data S in the recording medium 11 is finished.

As has been described above, in the third embodiment, the hierarchical data transferred and reproduced progressively are reproduced progressively on the monitor 14. Meanwhile, transfer of an obviously erroneous image or an image not to be printed can be interrupted. Therefore, unnecessary printing is avoided. Furthermore, efficient printing can be carried out, since waiting for transfer of the hierarchical data at all resolutions is not necessary.

In the third embodiment, information indicating print cancellation of the image data S whose transfer has been interrupted by the operator may be recorded in the recording medium brought in by the user. In this manner, when the recording medium is returned to the user, the user easily realizes which of the image data have not been printed.

A fourth embodiment of the present invention will be explained next. An image processing system according to the fourth embodiment has the same configuration as the image processing system of the third embodiment shown in FIG. 5. Therefore, detailed explanation of the system is omitted. In the fourth embodiment, transfer is interrupted after hierarchical data at a predetermined resolution among image data for printing transferred progressively have been transferred. Based on the hierarchical data at the resolution, an operator judges whether or not processing is carried out on the image data, and transfer is resumed after predetermined processing is carried out, if necessary.

Figure 7:
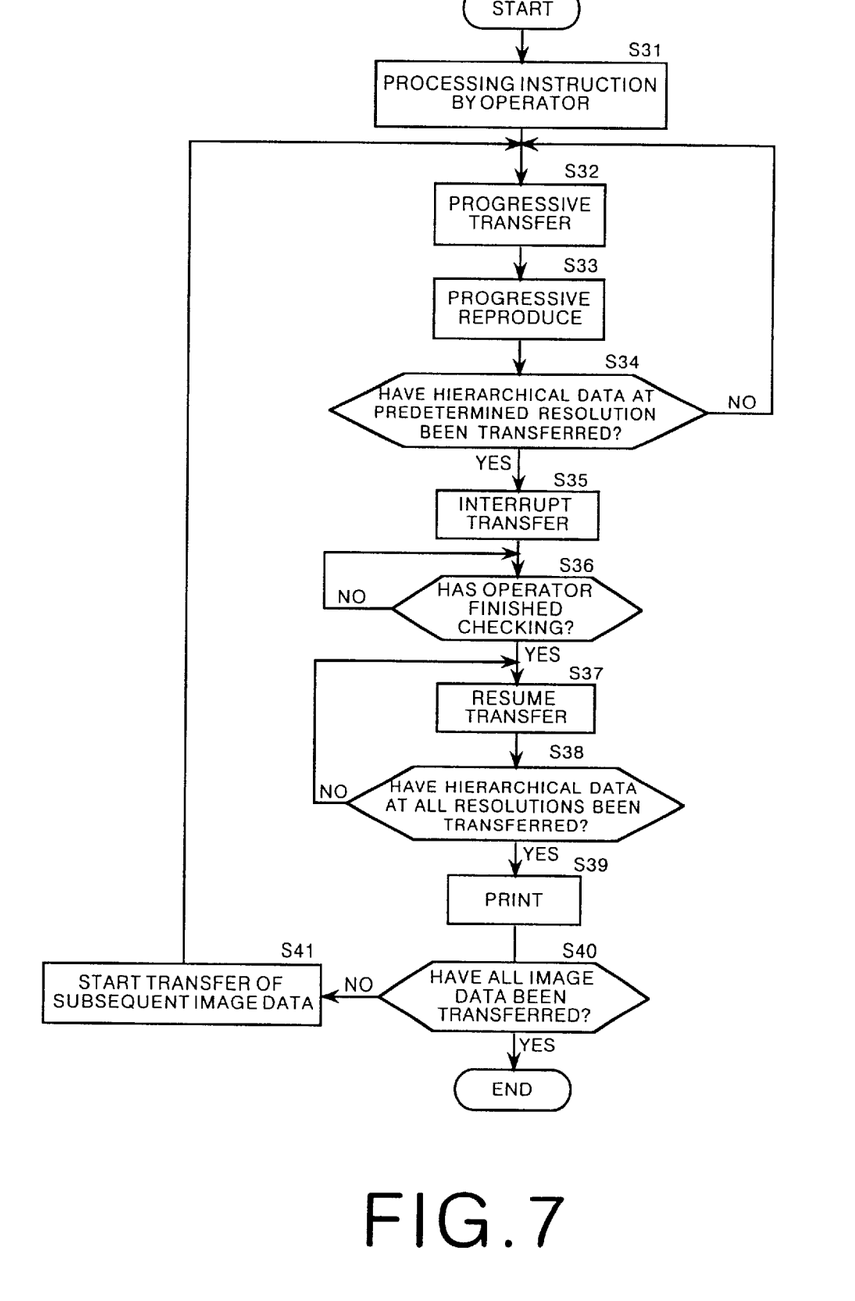
FIG. 7 is a flow-chart showing an operation of a fourth embodiment.

FIG. 7 is a flow-chart showing an operation of the fourth embodiment. At a step S31, an operator inputs a processing instruction by using input means 13. Image processing means 12 sequentially reads image data S from a recording medium 11 and progressively transfers the data to a monitor 14 (step S32). Images are reproduced progressively on the monitor 14 (step S33). At a step S34, whether or not the hierarchical data at the predetermined resolution have been transferred is judged. If the result of judgment in step S34 is no, the processing from the step S32 to the step S34 is repeated. If the result of judgment in step S34 is yes, data transfer to the monitor 14 is interrupted at a step S35. The operator views the hierarchical data at the predetermined resolution displayed on the monitor 14 and examines the color and density of the image. If necessary, the operator inputs an instruction to correct the color or density by using the input means 13. In this case, if correction is unnecessary, no such input is needed. After the operator has finished checking of the image in this manner (step S36), the transfer is resumed (step S37).

At a subsequent step S38, whether or not hierarchical data at all resolutions have been transferred is judged. When the step result of judgment in S38 is no, the processing returns to the step S37 and the processing from the step S37 to the step S38 is repeated. When the hierarchical data at all resolutions are judged to have been transferred at the step S38, the image processing means 12 carries out color conversion processing for printing on the image data having been transferred, and the processed image data are input to the printer 15 to be generated as a printed image (step S39). In this case, when the color and the density are corrected in response to the check by the operator, color conversion processing to generate the corrected color and density is carried out. Whether or not all the image data S recorded in the recording medium 1 have been transferred is judged at a step S40 after printing of the processed image data or after transfer of the processed image data to the printer 15 or after completion of the transfer of the hierarchical data at all resolutions, and the processing is finished if the result of judgment in step 40 is yes. If the result of judgment in step S40 is no, transfer of the subsequent image data S is resumed at a step S41, and the processing from the step S32 to the step S40 is repeated.

As has been described above, in the fourth embodiment, the hierarchical data transferred and reproduced progressively are sequentially displayed on the monitor 14 and the transfer of the hierarchical data is interrupted so that the image being displayed on the monitor 14 at the interruption is checked by the operator regarding the color or density thereof. Therefore, time necessary before the check is shortened compared to the case where the check is carried out after completion of transfer of the hierarchical data at all resolutions. In this manner, efficient printing can be carried out.

In the fourth embodiment, transfer of the hierarchical data is resumed after the check by the operator at the step S36. However, the transfer may be resumed automatically in the case of no input from the input means 13 within a predetermined amount of time after completion of the transfer of the hierarchical data at the predetermined resolution. In this manner, transfer, transfer interruption, transfer resumption, and printing of the hierarchical data at all resolutions can be carried out automatically without an operator, which leads to reduction in labor cost.

A fifth embodiment of the present invention will be explained next. An image processing system according to the fifth embodiment has the same configuration as the third embodiment shown in FIG. 5, and detailed explanation thereof is omitted. In the fifth embodiment, a set-up condition for image data having been transferred out of image data for printing transferred progressively is determined based on hierarchical image data at a predetermined resolution, and set-up processing is carried out on the image data having been transferred.

Figure 8:
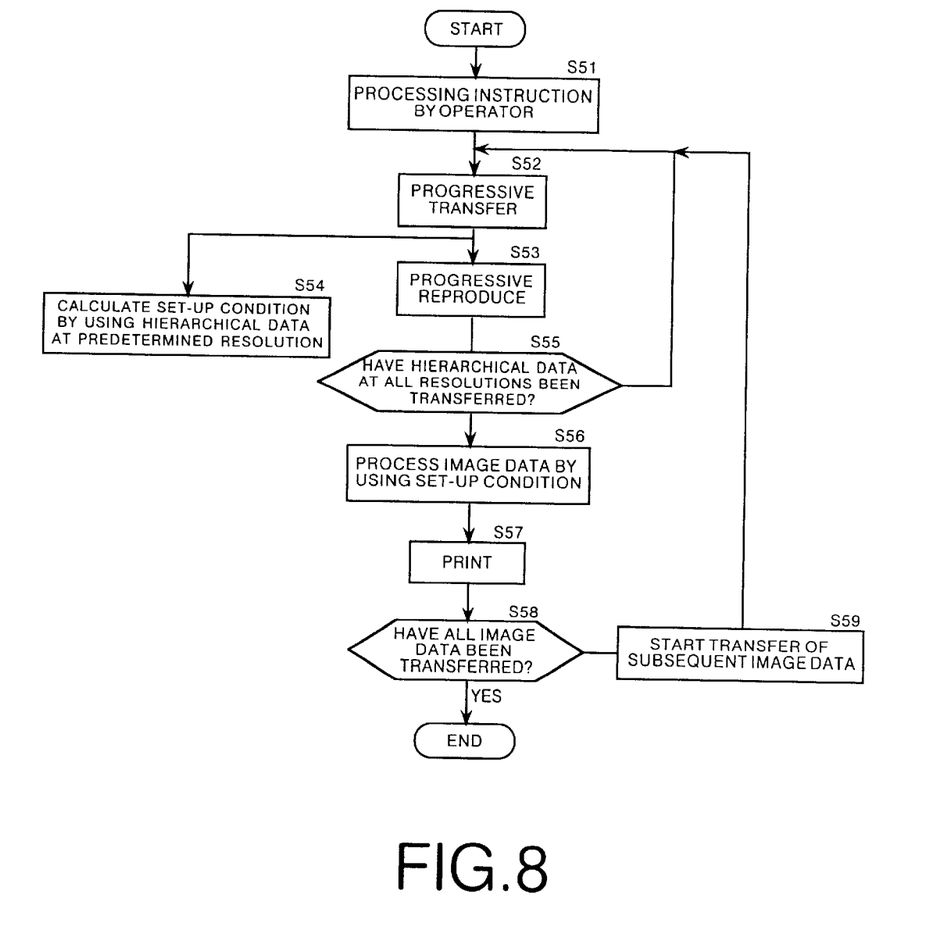
FIG. 8 is a flowchart showing an operation of a fifth embodiment.

FIG. 8 is a flow-chart showing an operation of the fifth embodiment. At a step S51, an operator inputs an processing instruction by using input means 13. Image processing means 12 sequentially reads image data from a recording medium 11 and progressively transfers the data to a monitor 14 (step S52). Images are progressively reproduced on the monitor 14 (step S53). Meanwhile, at the time of completion of transfer of hierarchical data at a predetermined resolution (a lowest resolution for example), a set-up condition for the image data having been transferred is determined based on the hierarchical data at the predetermined resolution (step S54). The processing at the step S54 is carried out in parallel to the progressive transfer and reproduction at the steps S52 and 53. The set-up condition herein referred to means a value for white balance adjustment or automatic exposure control.

As a method to adjust white balance, various methods can be adopted. For example, an average of each of RGB channels in each pixel in an image represented by the hierarchical data at the predetermined resolution is found, and white balance is adjusted by adjusting a gain of a color signal in such a manner that the found averages other than one average thereof agree with the one average. Alternatively, data are converted into intensity of an incident light and the gain of the color signal is adjusted in such a manner that each average of the above channels becomes an average of the incident light's intensity to the power of p ($0.5 \leq p \leq 1.5$) (Japanese Patent Application No. 10(1998)-66785). The value of the white balance adjustment in this case is the gain.

As a method of automatic exposure control, the following methods can be listed. For example, lightness component of the data at the predetermined resolution is found and exposure time at the time of exposing a recording paper by the printer 15 is controlled so that the lightness component becomes a print density (0.75) equivalent to 18% reflectivity. Another method controls the exposure time by considering saturation of the hierarchical data at the predetermined resolution (Japanese Patent Application No. 10(1998)-66784). In this case, the value of the automatic exposure control is the exposure time.

At a step S55, whether or not the hierarchical data at all resolutions have been transferred is judged. If the result of judgment in step S55 is no, the processing returns to the step S52 and the processing from the step S52 to the step S55 is repeated. If the result of judgment in step S55 is yes, processing based on the set-up condition calculated at the step S54 is carried out on the image data having been transferred, and processed image data are obtained (step S56). At a subsequent step S57, the processed image data are input to the printer 15 and reproduced as a print. Whether or not all the image data S recorded in the recording medium 11 have been transferred is judged at a step S58 after printing of the processed image data or after transfer of the processed image data to the printer 15 or after completion of transfer of the hierarchical data at all resolutions, and the processing is finished if the transfer of the all data is confirmed. If the result of judgment in step S58 is no, transfer of subsequent image data S is resumed at a step S59, and the processing from the step S52 to the step S58 is repeated.

As has been described above, in the fifth embodiment, the set-up condition is found based on the hierarchical data at the predetermined resolution transferred progressively, in parallel to the progressive transfer. Therefore, processing can be carried out on the image data having been transferred, immediately after completion of the progressive transfer. In this manner, efficient processing can be carried out on the image data having been transferred.

In the above embodiments, the hierarchical data at the predetermined resolution transferred progressively are progressively reproduced on the monitor 6 or 14. However, image processing according to the predetermined resolution of the hierarchical data may be carried out on the data and the processed hierarchical data may be reproduced progressively. As the image processing, unsharp masking processing, dynamic range compression processing, and frequency enhancing processing described in Japanese Unexamined Patent Publication No. 10(1998)-75395) maybe carried out. The unsharpness masking processing enhances a predetermined spatial frequency component of an original image signal by adding a product of an enhancement coefficient β and a difference between an original image signal Sorg and an unsharp image signal Sus to the original image signal Sorg. This can be represented by an equation (1) below:

$$Sproc = Sorg + \beta \times (Sorg - Sus) \quad (1)$$

(Sproc: a signal having been frequency-enhanced, Sorg: the original image signal, Sus: the unsharp image signal, β: the enhancement coefficient).

The dynamic range compression processing compresses a dynamic range of the original image signal Sorg by adding the unsharp image signal Sus converted by using a dynamic range compression coefficient D to the original image signal Sorg. This can be represented as follows using an equation (2):

$$Sdrc = Sorg + D(Sus) \quad (2)$$

(Sdrc: a signal having been dynamic-range compressed, Sorg: the original image signal, Sus: the unsharp image signal, D: the dynamic range compression coefficient).

The unsharp image signal Sus is used in the unsharpness masking processing and also in the dynamic range compression processing. The unsharp image signal Sus can be found through filtering processing on the original image signal Sorg by using a mask of a predetermined size. In this embodiment, the original image signal Sorg in the equations (1) and (2) above is the hierarchical data transferred progressively, and the unsharp image signal Sus is found by changing the mask size in accordance with the resolution of the hierarchical data. The unsharpness masking processing and the dynamic range compression processing represented by the equations (1) and (2) are carried out by using the above-calculated unsharp image signal Sus.

More specifically, the unsharp image signal Sus is found in the following manner. The case of unsharpness masking processing is explained here. By carrying out unsharpness masking processing on the hierarchical data at the highest resolution, that is, on the image data having been transferred, the processed image data Sproc having an enhanced frequency component in accordance with the mask size can be obtained. In the hierarchical data at a resolution lower than the highest resolution, if the same frequency component as that of the highest resolution is enhanced, an object therein different from the enhanced object in the highest resolution image is enhanced. In other words, if the resolution of the hierarchical data is ½ of the highest resolution and if an object having a frequency component of 1 cycle/mm is enhanced in the highest resolution image, an object having a frequency component of 2 cycles/mm in the highest resolution image is enhanced in the ½ resolution image when the unsharp image signal Sus is found by using the same size mask. Therefore, different objects are enhanced in the highest resolution image and the ½ resolution image, both having been unsharpness-masked.

For this reason, if frequency processing is carried out on the hierarchical data at the resolution lower than the highest one, the mask size used in calculation of the unsharp image signal Sus is changed in accordance with the resolution of the data. In other words, upon transfer of the hierarchical data, the resolution of the hierarchical data (for example, dpi or cycles/mm), or that of the highest resolution data and information on hierarchical level of the hierarchical data are transferred as resolution information, and the mask size is changed based on this information. For example, if the mask size for calculating the unsharp image signal Sus for the highest resolution data (the image data having been transferred) is 51×51, for the case of the resolutions ½ and ¼ of the highest, the mask sizes are 25×25 and 13×13 respectively, and the unsharp image signal Sus is found by using these values.

As has been described above, if the mask size for calculating the unsharp image signal Sus is changed in accordance with the resolution of the hierarchical data, processed data enabling reproduction of an image having the same enhanced object as the highest resolution image having been frequency processed or dynamic range compressed can be obtained. Therefore, image confirmation is carried out in the same manner as viewing an actual image, and judgment as to interruption and resumption of the transfer can be carried out easily. In this manner, progressive transfer can be carried out efficiently.

The frequency processing described in Japanese Unexamined Patent Publication Nos. 10-75395 is the processing shown below:

$$Sproc = Sorg + \beta(Sorg) \cdot Fusm(Sorg, Sus1, Sus2, \ldots SusN)$$

$$Fusm(Sorg, Sus1, Sus2, \ldots SusN) = \{f_1(Sorg - Sus1) + f_2(Sus1 - Sus2) + \ldots + f_k(Susk - 1 - Susk) + \ldots + f_N(SusN - 1 - SusN)\} \quad (3),$$

where Sproc: processed image data,
  Sorg: the image data having been transferred,
  Susk (k=1~N): hierarchical data that has been subjected to unsharp masking processing (the larger N, the lower the resolution),
  $f_k$ (k=1~N): a function to convert band-limited image data (Susk−1−Susk); and
  β(Sorg): an enhancement coefficient determined based on the image data having been transferred.

If such frequency processing is carried out by using the hierarchical data transferred progressively, processing using the function f can be carried out by obtaining the band-limited image data each time the hierarchical data at each resolution are transferred. Therefore, progressive reproduction can be carried out in parallel to the frequency enhancing processing. In this case, it is preferable for setting of the function f for carrying out processing on the band-limited image data to be changed in accordance with the resolution information of the transferred hierarchical data. In other words, since a slope or a degree of nonlinearity of the function f enabling appropriate frequency enhancing processing is different depending on the resolution of the hierarchical data, frequency processing shown in the above equation (3) is carried out by changing the slope or the degree of nonlinearity of the function f.

FIG. 9 is a flowchart showing yet another embodiment of the invention. Along the lines of the embodiments previously discussed, the flowchart discloses image storage, image processing, determination of image processing and image reproduction. The top flowchart box represents image storage. The second-highest box represents a determination of processing of the images. The third-highest box represents processing of the images. The bottom box represents image reproduction.

In the above embodiments, hierarchical data at each resolution are transferred progressively. However, in the case where image data are hierarchically stored according to density resolution, the data classified by density resolution are transferred progressively. In this case, the images to be progressively reproduced have gradually brighter density.

In the embodiments 3 to 5 above, the image data in the recording medium 11 are transferred progressively. However, the present invention is not limited to such cases and is applicable to a system for progressively transferring image data from an image server connected to a network.

Furthermore, in the above embodiments, the image data are compressed and stored by coding the hierarchical data at each resolution. However, since image data stored without compression of data at each hierarchical level can be transferred progressively, as for the cases of FlashPix files, the same processing as in the above embodiments can be carried out.

What is claimed is:

1. An image processing method of carrying out processing, upon progressive transfer of hierarchically stored image data at each hierarchical level, on hierarchical data to be transferred progressively and/or on image data having been transferred; said image data being transferred for processing based on the content of the image data; said content of the image data deriving from at least one of: hierarchical image data transferred earlier than hierarchical image data at a highest resolution to be transferred last, and hierarchical image data representing an image at a resolution higher than that of said hierarchical image data transferred earlier than hierarchical image data at a highest resolution to be transferred last;

the image processing method comprising the steps of:
determination of the content of processing to be carried out, based on: hierarchical data at a predetermined intermediate hierarchical level out of the hierarchical data at each level transferred progressively, on hierarchical data to be transferred after the hierarchical data at the intermediate level, and/or on the image data having been transferred, and carrying out processing on the hierarchical data to be transferred and/or on the image data having been transferred, based on the determined content of the processing.

2. An image processing method as claimed in claim 1, wherein the content of the processing to be carried out includes the interruption of the progressive transfer of the hierarchical data to be transferred.

3. An image processing method as claimed in claim 1, wherein the content of the processing to be carried out includes enabling the resumption of the progressive transfer of the hierarchical data to be transferred, after interruption of the progressive transfer.

4. An image processing method as claimed in any one of claims 1 to 3, wherein the content of the processing to be carried out includes processing carried out on the image data having been transferred.

5. The method of claim 1, further comprising: displaying the image data of each hierarchical level, wherein the determination of the content of processing follows the display of the image data at each respective hierarchical level.

6. The method of claim 5, further comprising determining a set up condition from hierarchical data of low resolution and processing the image data according to the set up condition.

7. The method of image processing in claim 1, further wherein:
hierarchically stored image data is structured in a hierarchy based on multiple resolutions;
said image data being transferred for processing based on a display of at least one of said multiple resolutions.

8. The method of claim 1, further wherein said determination of the processing to be carried out includes a tone and/or frequency determination.

9. An image processing apparatus for carrying out processing, upon progressive transfer of hierarchically stored image data at each hierarchical level, on hierarchical data to be transferred progressively and/or on image data having been transferred; said image data being transferred for processing based on the content of the image data; said content of the image data deriving from at least one of: hierarchical image data transferred earlier than hierarchical image data at a highest resolution to be transferred last, and hierarchical image data representing an image at a resolution higher than that of said hierarchical image data transferred earlier than hierarchical image data at a highest resolution to be transferred last;

the image processing apparatus comprising:
determination means for determining, based on: hierarchical data at a predetermined intermediate hierarchical level out of the hierarchical data of all hierarchically stored image data which has been and will be transferred progressively, the content of the processing on hierarchical data to be transferred after the predetermined intermediate level data and/or on the image data having been transferred, and processing means for carrying out processing on the hierarchical data to be transferred and/or on the image data having been transferred, based on the processing content having been determined.

10. An image processing apparatus as claimed in claim 9, wherein the determination means comprises:
reproduction means for progressively reproducing the hierarchical data at each level which is transferred progressively;
interruption input means for receiving an input of interruption of the progressive transfer; and
interruption means for interrupting the progressive transfer in the case where the interruption input has been received by the interruption input means.

11. An image processing apparatus as claimed in claim 10, wherein the determination means further comprises:
resumption input means for receiving an input of resumption of the progressive transfer; and
resumption means for resuming the progressive transfer in the case where the resumption input has been received by the resumption input means.

12. An image processing apparatus as claimed in claim 11, wherein the determination means further comprises canceling means for canceling the progressive transfer when the resumption input is not received by the resumption input means within a predetermined amount of time after the interruption of the progressive transfer by the interruption means.

13. An image processing apparatus as claimed in any one of claims 10 to 12, wherein the image processing apparatus further comprises image processing means for obtaining processed hierarchical data by carrying out predetermined image processing on the progressively reproduced hierarchical data at each level based on resolution information of the progressively reproduced the hierarchical data, wherein
the reproduction means progressively reproduces the processed hierarchical data.

14. An image processing apparatus as claimed in claim 9, wherein the determination means comprises:
reproduction means for progressively reproducing the hierarchical data at each level transferred progressively; and
interruption means for interrupting the progressive transfer immediately after a predetermined level of data has been transferred.

15. An image processing apparatus as claimed in claim 14, wherein the determination means further comprises:
resumption input means for receiving an input of resumption of the progressive transfer; and
resumption means for resuming the progressive transfer in the case where the resumption input has been received by the resumption input means.

16. An image processing apparatus as claimed in claim 15, wherein the determination means further comprises canceling means for canceling the progressive transfer when the resumption input is not received by the resumption input means within a predetermined amount of time after the interruption of the progressive transfer by the interruption means.

17. An image processing apparatus as claimed in any one of claims 14 to 16, wherein the image processing apparatus further comprises image processing means for obtaining processed hierarchical data by carrying out predetermined image processing on the hierarchical data at each level reproduced progressively, based on resolution information of the progressively reproduced hierarchical data, wherein the reproduction means progressively reproduces the processed hierarchical data.

18. An image processing apparatus as claimed in claim 9, wherein:

the determination means comprises: image processing condition determining means for determining a condition of image processing to be carried out on the image data having been transferred, based on the predetermined levels of hierarchically stored image data; and the processing means for carrying out image processing on the image data having been transferred, is based on the image processing condition.

19. An image processing apparatus as claimed in claim 9, wherein the determination means comprises:

reproduction means for progressively reproducing the hierarchical data at each level transferred progressively;

interruption means for interrupting the progressive transfer immediately after a predetermined level of data has been transferred;

image processing condition input receiving means for receiving as an input an image processing condition determined by the predetermined levels of all hierarchically stored image data which has been and will be out on the image data having been transferred;

resumption input means for receiving an input of resumption of the progressive transfer;

resumption means for resuming the progressive transfer in the case where the resumption input means has received the resumption input; and image processing means for carrying out image processing on the image data having been transferred, based on the image processing condition.

20. An image processing apparatus as claimed in claim 19, wherein the resumption means resumes the progressive transfer when the resumption input is not received by the resumption input means within a predetermined amount of time after the interruption of the progressive transfer by the interruption means.

21. An image processing apparatus as claimed in claim 19 or 20, the image processing apparatus further comprising:

image processing means for obtaining processed image data by carrying out predetermined image processing on the hierarchical data at each level reproduced progressively, based on resolution information of the progressively reproduced hierarchical data, wherein the reproduction means progressively reproduces the processed image data.

22. The apparatus of claim 9, further comprising a display for displaying the image data of each hierarchical level, and wherein the determination means responds to a user input to determine the content of processing, after the display displays the image data for each respective hierarchical level.

23. The method of image processing in claim 9, further wherein:

hierarchically stored image data is structured in a hierarchy based on multiple resolutions; said image data being transferred for processing based on a display of at least one of said multiple resolutions.

24. The apparatus of claim 9, further wherein said determination of the processing to be carried out includes a tone and/or frequency determination.

25. A computer-readable recording medium storing a program to cause a computer to execute an image processing method of carrying out processing, upon progressive transfer of hierarchically stored image data at each hierarchical level, on hierarchical data to be transferred progressively and/or on image data having been transferred; said image data being transferred for processing based on the content of the image data; said content of the image data deriving from at least one of: hierarchical image data transferred earlier than hierarchical image data at a highest resolution to be transferred last, and hierarchical image data representing an image at a resolution higher than that of said hierarchical image data transferred earlier than hierarchical image data at a highest resolution to be transferred last;

the program comprising the procedures of:

determination of the content of processing to be carried out, based on hierarchical data at a predetermined intermediate hierarchical level out of the hierarchical data at each level transferred-progressively, on hierarchical data to be transferred after the data at the intermediate hierarchical level and/or on the image data having been transferred, and carrying out processing on the hierarchical data to be transferred and/or on the image data having been transferred, based on the determined content of the processing.

26. A computer-readable recording medium as claimed in claim 25, procedure of carrying-out processing comprising the actions of:

reproducing the hierarchical data at each level transferred progressively; and interrupting the progressive transfer in the case where an interruption input has been received.

27. A computer-readable recording medium as claimed in claim 26, wherein the procedure of carrying-out processing further comprises the actions of:

resuming the progressive transfer in the case where a resumption input has been received.

28. A computer-readable recording medium as claimed in claim 27, wherein the procedure of carrying-out processing further comprises the actions of canceling the progressive transfer in the case where the resumption input is not received within a predetermined amount of time after the interruption of the progressive transfer.

29. A computer-readable recording medium as claimed in any one of claims 26 to 28, the program further comprising the action of obtaining processed hierarchical data by carrying out predetermined image processing on the progressively reproduced hierarchical data at each level based on resolution information of the progressively reproduced hierarchical data at each level, the procedure of progressive reproduction being the procedure of progressively reproducing the processed hierarchical data.

30. A computer-readable recording medium as claimed in claim 25, wherein the procedure of carrying-out processing includes the actions of:

progressively reproducing the hierarchical data at each level transferred progressively; and interrupting the progressive transfer immediately after a predetermined level of hierarchically stored image data has been transferred.

31. A computer-readable recording medium as claimed in claim 30, wherein the procedure of carrying-out processing further includes the actions of:
   resuming the progressive transfer in the case where a resumption input has been received.

32. A computer readable recording medium as claimed in claim 31, wherein the procedure of carrying-out processing further includes the actions of canceling the progressive transfer when the resumption input is not received within a predetermined amount of time after the interruption of the progressive transfer.

33. A computer-readable recording medium as claimed in any one of claims 30 to 32, wherein the program further includes the actions of obtaining processed hierarchical data by carrying out predetermined image processing on the hierarchical data at each level reproduced progressively, based on resolution information of the progressively reproduced hierarchical data,
   the procedure of progressive reproduction being a procedure of progressively reproducing the processed hierarchical data.

34. A computer-readable recording medium as claimed in claim 25, wherein the procedure of carrying-out processing includes the actions of:
   determining a condition of image processing to be carried out on the image data having been transferred, based on the predetermined levels of hierarchically stored image data; and
   carrying out image processing on the image data having been transferred, based on the image processing condition.

35. A computer-readable recording medium as claimed in claim 25, wherein the procedure of carrying-out processing further includes the actions of:
   progressively reproducing the hierarchical data at each level transferred progressively;
   interrupting the progressive transfer immediately after a predetermined level of data has been transferred;
   receiving as an input an image processing condition determined by the predetermined levels of all hierarchically stored image data which has been and will be transferred;
   resuming the progressive transfer in the case where a resumption input has been received; and
   carrying out image processing on the image data having been transferred, based on the image processing condition.

36. A computer-readable recording medium as claimed in claim 35, wherein the action of resuming the progressive transfer occurs when the resumption input is not received within a predetermined amount of time after the interruption of the progressive transfer.

37. A computer-readable recording medium as claimed in claims 35 or 36, wherein the program further includes the actions of obtaining processed image data by carrying out predetermined image processing on the hierarchical data at each level reproduced progressively, based on resolution information of the progressively reproduced hierarchical data,
   the procedure of progressive reproduction being the procedure of reproducing the processed image data progressively.

38. The computer-readable medium of claim 25, further wherein said determination of the processing to be carried out includes a tone and/or frequency determination.

39. An image processing method for progressive transfer of hierarchically stored image data; said image data being transferred for processing based on the content of the image data; said content of the image data deriving from at least one of: hierarchical image data transferred earlier than hierarchical image data at a highest resolution to be transferred last, and hierarchical image data representing an image at a resolution higher than that of said hierarchical image data transferred earlier than hierarchical image data at a highest resolution to be transferred last;
   said method comprising:
      receiving a first hierarchical level of image data;
      determining processing based on the received first hierarchical level of image data, said processing comprising at least one of: receiving a second hierarchical level of image data; stopping transmission of the second hierarchical level of image data; and
      performing the determined processing.

40. The method of claim 39, wherein the first hierarchical data is lower in at least one of: density and resolution than the second hierarchical data.

41. The method of claim 39, further wherein said determination of the processing includes a tone and/or frequency determination.

42. An image processing system for progressive transfer of hierarchically stored image data; said image data being transferred for processing based on the content of the image data; said content of the image data deriving from at least one of:
   hierarchical image data transferred earlier than hierarchical image data at a highest resolution to be transferred last, and hierarchical image data representing an image at a resolution higher than that of said hierarchical image data transferred earlier than hierarchical image data at a highest resolution to be transferred last;, said apparatus comprising:
      a terminal unit receiving a first hierarchical level of image data;
      determining device for determining processing based on the received first hierarchical level of image data, said processing comprising at least one of: receiving a second hierarchical level of image data; stopping transmission of the second hierarchical level of image data; and
      a processor for performing the determined processing.

43. The system of claim 42, wherein the first hierarchical data is lower in at least one of: density and resolution than the second hierarchical data.

44. The apparatus of claim 42, further wherein said determination device further determines tone and/or frequency.

45. An apparatus for image processing wherein:
   hierarchically stored image data is structured in a hierarchy based on multiple resolutions;
   said image data being transferred for processing based on the content of the image data;
   said content of the image data deriving from at least one of: hierarchical image data transferred earlier than hierarchical image data at a highest resolution to be transferred last, and hierarchical image data representing an image at a resolution higher than that of said hierarchical image data transferred earlier than hierarchical image data at a highest resolution to be transferred last, further wherein the apparatus includes:

determination means for determining said content of the image data.

46. The apparatus for image processing as in claim 45, further comprising:

processing means for processing said image data is processed according to said content of said image data.

47. The apparatus of claim 45, further wherein said determination means further determines tone and/or frequency.

48. An image processing method wherein:

hierarchically stored image data is structured in a hierarchy based on multiple resolutions;

said image data being transferred for processing based on the content of the image data;

said content of the image data deriving from at least one of: hierarchical image data transferred earlier than hierarchical image data at a highest resolution to be transferred last, and hierarchical image data representing an image at a resolution higher than that of said hierarchical image data transferred earlier than hierarchical image data at a highest resolution to be transferred last, said method further including:

a determination step that determines the content of the image data.

49. The method of image processing in claim 48, further wherein:

said image data is processed according to said content of said image data.

50. The method of claim 48, further wherein said determination step further determines tone and/or frequency.

* * * * *